United States Patent
Von der Osten-Sack et al.

(10) Patent No.: US 9,523,335 B2
(45) Date of Patent: Dec. 20, 2016

(54) PLUNGER FOR AN INTERNAL COMBUSTION ENGINE FUEL PUMP

(71) Applicant: Caterpillar Motoren GmbH & Co. KG, Kiel (DE)

(72) Inventors: Andreas Von der Osten-Sack, Kiel (DE); Ole Ohrt, Beringstedt (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 59 days.

(21) Appl. No.: 14/403,094

(22) PCT Filed: May 21, 2013

(86) PCT No.: PCT/EP2013/001500
§ 371 (c)(1),
(2) Date: Nov. 21, 2014

(87) PCT Pub. No.: WO2013/178334
PCT Pub. Date: Dec. 5, 2013

(65) Prior Publication Data
US 2015/0107560 A1    Apr. 23, 2015

(30) Foreign Application Priority Data
May 30, 2012    (EP) .................................... 12170081

(51) Int. Cl.
*F02M 37/04*    (2006.01)
*F02M 59/26*    (2006.01)
(Continued)

(52) U.S. Cl.
CPC ............ *F02M 59/26* (2013.01); *F02M 59/265* (2013.01); *F16J 1/00* (2013.01); *F02M 45/12* (2013.01);
(Continued)

(58) Field of Classification Search
CPC .... F02M 47/027; F02M 57/025; F02M 45/12; F02M 59/102; F02M 59/366
(Continued)

(56) References Cited

U.S. PATENT DOCUMENTS 3,566,849 A * 3/1971 Frick .................... F02M 59/265
                                                            123/364
3,876,153 A    4/1975 Roosa
(Continued)

FOREIGN PATENT DOCUMENTS

CN    201521382    7/2010
DE    763 005    3/1954
(Continued)

OTHER PUBLICATIONS

International Search Report dated Dec. 20, 2012, in EP Application EP 12 17 0081 (2 pages).
(Continued)

*Primary Examiner* — Lindsay Low
*Assistant Examiner* — Charles Brauch

(57) ABSTRACT

A plunger of a fuel pump is disclosed. The plunger may have a cylindrical base configured for axial movement and rotation within a pump barrel. The plunger may also have a fuel amount controlling end. The fuel amount controlling end may have a recessed surface region. The fuel amount controlling end may also have a sealing surface region. Further, the fuel amount controlling end may have a control interface connecting the recessed surface region with the sealing surface section in a radial direction. The transition from the recessed surface region to the control interface may be curved.

20 Claims, 4 Drawing Sheets

(51) Int. Cl.
*F16J 1/00* (2006.01)
*F02M 59/36* (2006.01)
*F02M 47/02* (2006.01)
*F02M 57/02* (2006.01)
*F02M 59/10* (2006.01)
*F02M 45/12* (2006.01)

(52) U.S. Cl.
CPC .......... *F02M 47/027* (2013.01); *F02M 57/025* (2013.01); *F02M 59/102* (2013.01); *F02M 59/366* (2013.01); *F02M 2200/04* (2013.01)

(58) Field of Classification Search
USPC ....................................................... 123/496
See application file for complete search history.

(56) References Cited

U.S. PATENT DOCUMENTS

| | | | |
|---|---|---|---|
| 4,090,819 A | 5/1978 | Bastenhof | |
| 4,161,161 A | 7/1979 | Bastenhof | |
| 5,297,523 A | 3/1994 | Hafner et al. | |
| 7,201,334 B2 | 4/2007 | Sasaki et al. | |
| 7,735,473 B2 | 6/2010 | Kato et al. | |
| 7,810,471 B2 | 10/2010 | Zdroik | |
| 2004/0118386 A1 | 6/2004 | Stewart et al. | |

FOREIGN PATENT DOCUMENTS

| | | |
|---|---|---|
| DE | 39 02 764 | 2/1990 |
| DE | 10 2009 054 441 | 6/2011 |
| EP | 1 559 908 | 8/2006 |
| EP | 2 339 166 | 6/2011 |
| EP | 2 634 237 | 9/2013 |
| FR | 1 567 479 | 5/1969 |
| JP | 57-030375 | 2/1982 |
| JP | 2008-121665 | 5/2008 |
| WO | WO 2008/065248 | 11/2007 |
| WO | WO 2010/136655 | 12/2010 |

OTHER PUBLICATIONS

European Search Report dated Dec. 20, 2012, in EP Application EP 12 17 0081 (2 pages).

* cited by examiner

PLUNGER FOR AN INTERNAL COMBUSTION ENGINE FUEL PUMP

CLAIM FOR PRIORITY

This application is a U.S. National Phase entry under 35 U.S.C. §371 from PCT International Application No. PCT/EP2013/001500, filed May 21, 2013, which claims benefit of priority of European Patent Application No. 12170081.9, filed May 30, 2012, all of which are incorporated herein by reference.

TECHNICAL FIELD

The present disclosure generally refers to fuel pumps and more particularly to fuel pumps using a plunger with a control interface.

BACKGROUND

The operation of internal combustion engines with alternative fuels may result in strong wear of those components of the fuel system that are in contact with the fuel. Specifically, fuel systems may be affected by the increased cavitation activity caused by an increased water content of alternative fuels.

Additionally to the operation with alternative fuels, fuel systems may also be configured for interchanging operation with conventional fuels, including diesel fuels (DFO), light fuel oil (LFO), heavy fuel oil (HFO), or low and high sulphur fuels. Thus, generally, the fuel systems may become in contact with a large variety of types of fuels at various temperatures and pressures.

Fuel systems may comprise high pressure fuel pumps using a plunger as disclosed, for example, in EP 2 339 166 A1. FR 1 567 479A discloses further a step-wise recessed fuel control region on the plunger's surface. High pressure pumps may be used for marine engines, construction machine engines, or other large internal combustion engines.

Fuel systems may further comprise various high pressure components such as a high pressure pump connector, short high pressure pipes, and long high pressure pipes. Finally, the fuel system may comprise an injection system.

Alternative fuels include, for example, first generation biofuels (e.g. palm oil, canola oil, oils based on animal fat) and second generation biofuels (e.g. oils made of non food corps, i.e. waste biomass). Examples of second generation biofuel include "pyrolysis oils" obtained from the pyrolysis of, e.g., wood or agricultural wastes, such as the stalks of wheat or corn, grass, wood, wood shavings, grapes, and sugar cane. In particular, alternative fuels may have an increased water content of, for example, <26% by volume as it may be the case for pyrolysis oils and ethanol based fuels as described in the European patent application EP 12 157 275.4 filed on 28 Feb. 2012 by Caterpillar Motoren GmbH & Co. KG.

The chemical composition and the physical properties of alternative fuels such as pyrolysis oils and ethanol based fuels and of low sulphur fuels can differ significantly from those of DFO, LFO, and HFO, in particular with respect to the high content of water and oxygen, the acidic pH-value in the range around, e.g., 2 to 3.5, and the rather low heating value. Moreover, alternative fuels and low sulphur fuels can have poor or completely missing lubrication properties and usually comprise small size particles in the range of, e.g., 0.1-5 μm. Also the temperature of use is generally lower for alternative fuels and low sulphur fuels than for, e.g., HFO.

For example, a temperature of use of 60° C. is common for pyrolysis oils to provide a viscosity, which is suitable for fuels to be injected into a combustion chamber of an engine.

Due to the chemical composition and the physical properties of alternative fuels, alternative fuels may have an increased cavitation and corrosion activity and increase the wear of the components of the fuel system.

The present disclosure is directed, at least in part, to improving or overcoming one or more aspects of prior systems.

SUMMARY OF THE DISCLOSURE

According to an aspect of the present disclosure, a plunger may have an essentially cylindrical base shape for axial movement and rotation within a pump barrel of a fuel pump. The plunger may comprise, at a fuel amount controlling end of the plunger, an outer surface that comprises a recessed surface region, a sealing surface section, and a control interface connecting in radial direction the recessed surface region with the sealing surface section. The transition from the recessed surface region to the control interface may be curved.

According to another aspect of the present disclosure, a plunger with an essentially cylindrical base shape for axial movement and rotation within a pump barrel of a fuel pump may comprise, at a fuel amount controlling end of the plunger, an outer surface that comprises a recessed surface region, a sealing surface section, and a control interface connecting in radial direction the recessed surface region with the sealing surface section, wherein the transition from the control interface to the recessed surface region has a radius equal to or larger than 1 mm, for example, equal to or larger than 2 mm such as 3 mm.

According to another aspect of the present disclosure, a plunger with an essentially cylindrical base shape for axial movement and rotation within a pump barrel of a fuel pump may comprise, at a fuel amount controlling end of the plunger, an outer surface that comprises a recessed surface region, a sealing surface section, and a control interface connecting in radial direction the recessed surface region with the sealing surface section, wherein the transition from the control interface face to the recessed surface region is configured as a curved face providing, at the radial inner section of the control interface, a curvature radius of the transition from a control face to the recessed surface region at a radius larger than 1 mm, for example, larger than 2 mm such as 3 mm and, at the radial outer section of the control interface, a corner angle larger than 90° as a tangent at the control face at the plunger sealing radius extends with respect to the radial direction under an angle in the range from 5° to 20°, for example, in the range from 10° to 15° such as 12°.

According to another aspect of the present disclosure, a fuel pump for an internal combustion engine may comprise a pump housing, arranged within the pump housing, a pump barrel, and, arranged within pump barrel, a plunger as described above.

In some embodiments, the rounding of the inner step and/or the corner angle, for example, due to the chamfer of the control interface may reduced the cavitation activity during operation of the fuel pump and may, thereby, extend the plunger's and thus the fuel pump's lifetime.

Other features and aspects of this disclosure will be apparent from the following description and the accompanying drawings.

DETAILED DESCRIPTION

Figure 1:
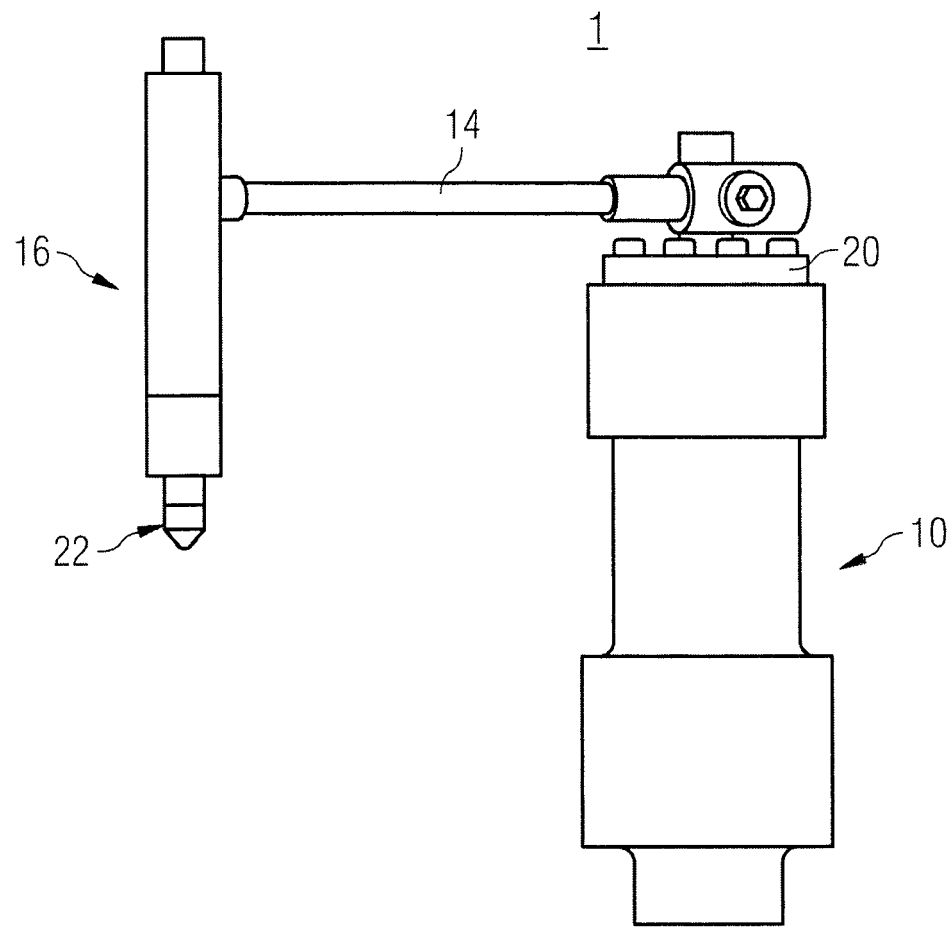
FIG. 1 is a side view of a schematically isolated fuel system for an internal combustion engine.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based on the realization that engines operated with fuels, which may have an increased cavitation activity, may be prone to a shortening of the lifetime of respective components of the fuel system due to increased surface wear and damaging. An increase in surface wear may be in particular the case for components when the fuel is pressurized and/or guided around corners. Initially the surface may be damaged on a micro-scale whereby the damages may then increase to fractions of the component. Once a surface is damaged, corrosive features of fuels may add to shortening the components lifetime.

The present disclosure is further based on the realization that in fuel pumps cavitation may occur; in particular, when the fuel pumps may be mechanically controlled by a plunger having a control interface that opens a fuel port through which a pump chamber is fluidly connected with a fuel supply gallery. Specifically, cavitation may occur when a pressure, which is higher in the pump chamber than in the fuel supply gallery, is released through the fuel port. This may be the case, for example, at the end of a pressure build up period of the pumping cycle. It was further realized that, in order to reduce the fuel pump vulnerability to cavitation, one may adjust the control interface's geometry and, for example, remove any sharp corners or step-like geometries along the fuel path at the time of opening the fuel port.

In view of alternative fuels being prone to cavitation formation, it is proposed to, for example, use a transition with a curvature that is specifically designed to have a large curvature of, for example, or larger than 1 mm, 2 mm, 3 mm; accordingly the designed radius is larger than a radius usually provided due to the manufacturing—boundary condition such as tool size or plate radius.

Figure 2:
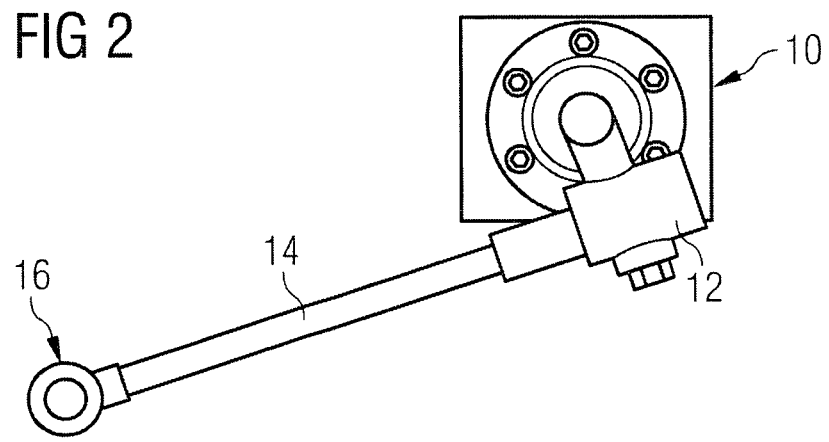
FIG. 2 is a top view of the schematically isolated fuel system of FIG. 1.

In FIG. 1 and FIG. 2, a general fuel system 1 for an internal combustion engine is shown as a side view and as a top view, respectively. Fuel system 1 may comprise a high pressure fuel pump 10, a short high pressure pipe 12, a long high pressure pipe 14, and an injector system 16. In such a system, fuel may be pressurized in high pressure fuel pump 10 and provided to the injector system 16. Specifically, high pressure fuel pump 10 may comprise a valve carrier 20 for connecting to high pressure pipes 12 and 14 and providing the pressurized fuel to an injection nozzle 22 of injection system 16.

High pressure fuel pump 10 may comprise a pump configuration as disclosed, for example, in (not-yet published) European patent application EP 11 176 050.0 filed on 29 Jul. 2011 by Caterpillar Motoren GmbH & Co. KG.

Figure 3:
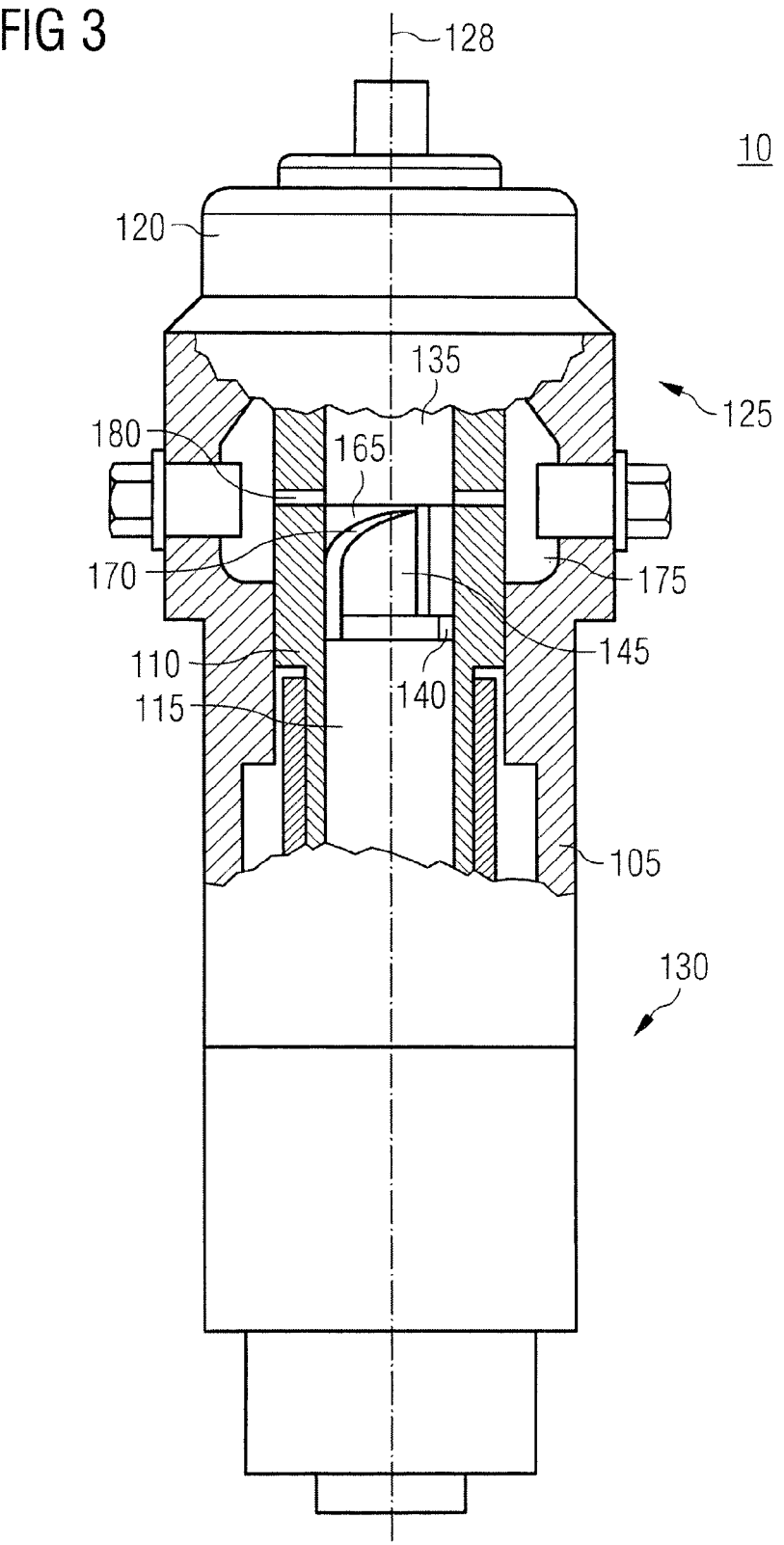
FIG. 3 is a side view with a partial cross-sectional side view of a plunger operated fuel pump.
Figure 4:
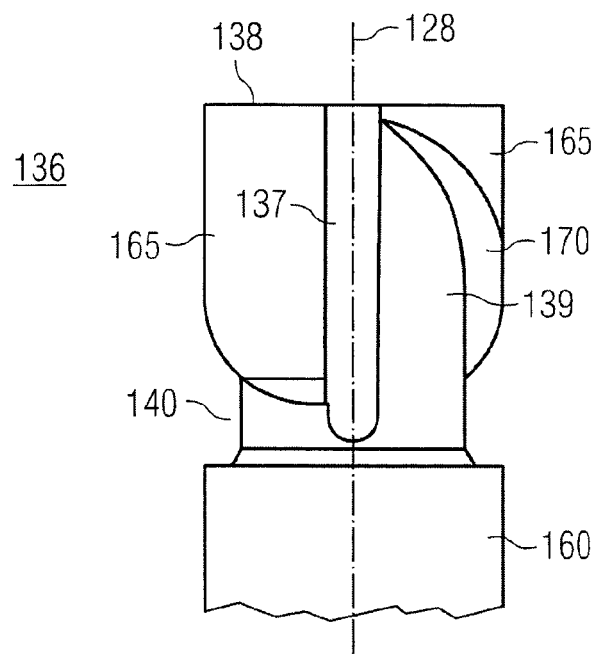
FIG. 4 is schematic view of a plunger head with a control interface.
Figure 5:
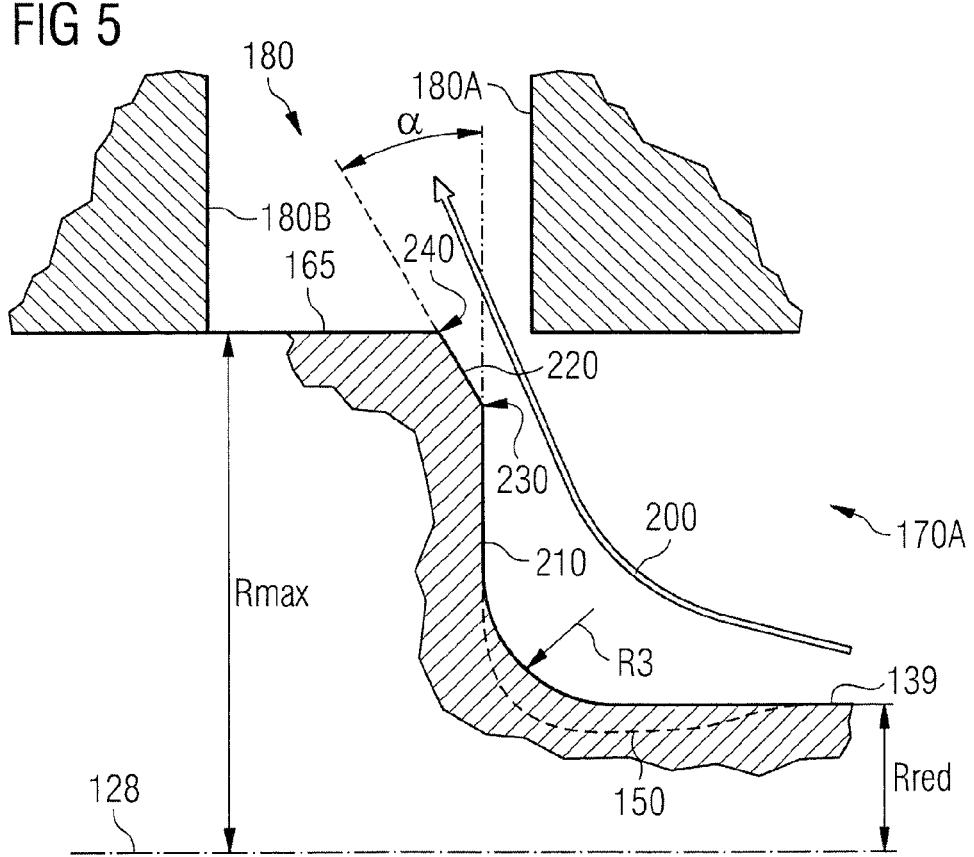
FIG. 5 is a cut view of an exemplary embodiment of a control interface of a plunger.
Figure 6:
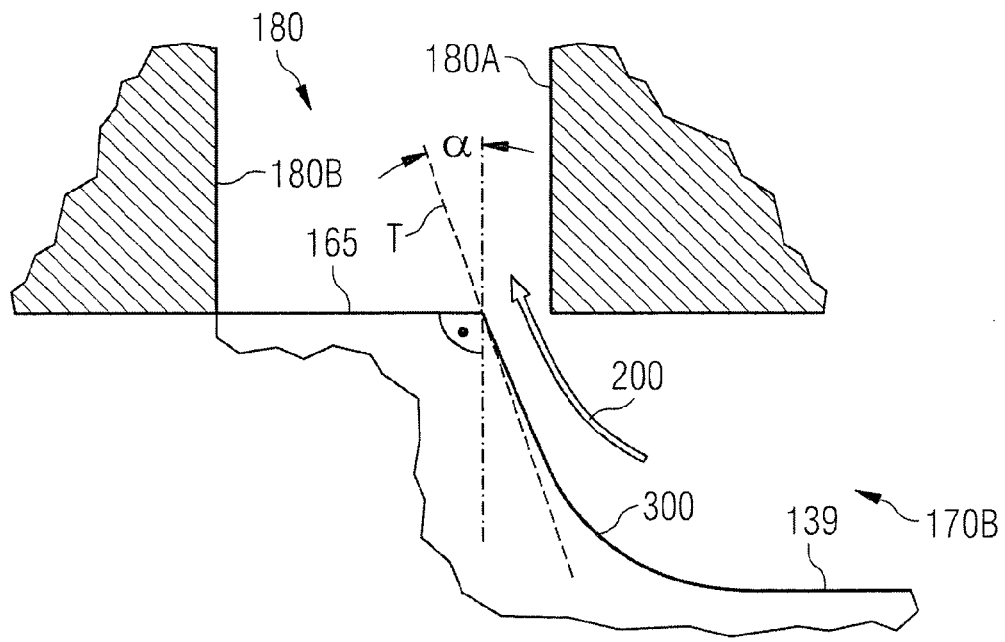
FIG. 6 is a cut view of an exemplary embodiment of a control interface of a plunger.
Figure 7:
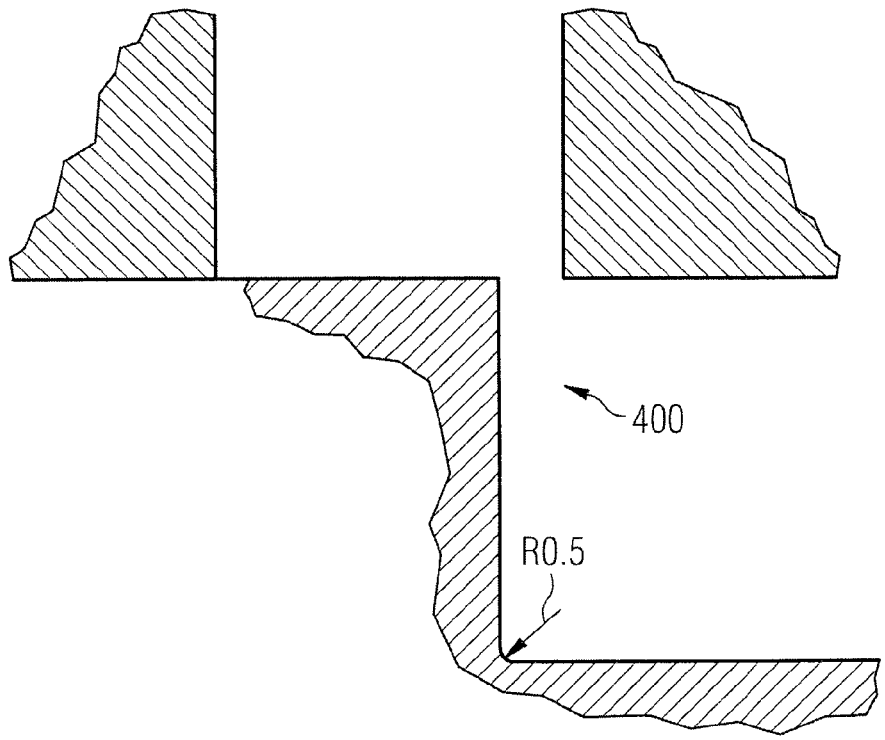
FIG. 7 is a cut view of a control interface of a prior art plunger.

The configuration and the function of a control interface in a fuel pump is disclosed in connection with FIGS. 3 to 6. FIG. 3 shows an exemplary fuel pump, FIG. 4 shows an exemplary embodiment of a plunger head, and FIG. 5 and FIG. 6 show cut views of exemplary control interfaces provided at a plunger head. For comparison, FIG. 7 shows a cut view of a conventional control interface.

Referring to FIG. 3, a fuel pump 10 may comprise a pump housing 105, a pump barrel 110, a plunger 115, and a valve carrier 120. Pump housing 105 and pump barrel 110 may be substantially cylindrical, whereas plunger 115 may be pin-like. Valve carrier 120 may be cap-like.

At a pump head side 125 of fuel pump 10, pump housing 105 and pump barrel 110 may be closed with valve carrier 120. Valve carrier 120 may be connected to pump housing 105 by screws as schematically indicated in FIG. 2. Additional or alternative fasting elements may be used for connecting valve carrier 120 to pump housing 105.

At pump head side 125, fuel may be received, pressurized, and then provided as pressurized fuel via valve carrier 120 to injector system 16. The pressurization of the fuel may be performed by an oscillatory movement of plunger 115 within pump barrel 110 along an axial direction 128 of fuel pump 10. Axial direction 128 as indicated in FIG. 3 coincides with the plunger axis. To drive the oscillatory movement, plunger 115 may be connected, for example, with a camshaft of the internal combustion engine (not shown) at a pump body side 130 of fuel pump 10.

A pump chamber 135 may be provided at pump head side 125. Pump chamber 135 may be delimited by pump barrel 110 in a radial direction. Pump chamber 135 may further be delimited by plunger 115 at one axial side and valve carrier 120 at the opposing axial side. Within valve carrier 120, a spring forced high pressure valve (also referred to as flow limiter) and a pressure relief valve for constant pre-pressure in fuel line 14 (both not shown) may be arranged.

During the oscillatory movement of plunger 115, pump chamber 135 may continuously increase and decrease. During the increasing phase, fuel may enter pump chamber 135 while during the decreasing phase, the fuel may be pressurized and then be released as pressurized fuel to injector system 16 via pipe connection 14.

To provide a sealing between pump barrel 110 and plunger 115, plunger 115 may comprise at the required axial positions a radial extension Rmax that corresponds to the inner radius of pump barrel 110.

As illustrated exemplarily for a plunger head 136 in FIG. 4, plunger 115 may further comprise a pair of opposing zero fuel grooves 137. Zero fuel grooves 137 may extend from an end face 138 of plunger 115 at a valve carrier side in axial direction along the plunger surface. At pump head side 125, zero fuel grooves 137 may be the only recess within the circumference of plunger 115 for some initial distance. Then, zero fuel grooves 137 may be neighbored to an azimuthal side by a recessed surface section 139 of plunger 110 having a reduced radius Rred. Reduced radius Rred may be larger than the radius of plunger 115 within zero fuel grooves 137. Zero fuel grooves 137 and recessed surface section 139 may open into a circularly extending groove 140.

Referring again to FIG. 3, zero fuel grooves 137, recessed surface section 139, and circularly extending groove 140 may form a pressure release chamber 145 between pump barrel 110 and plunger 115. Pressure release chamber 145 may be in fluid connection with pump chamber 135 through zero fuel grooves 140 but may maintain its volume during the oscillatory movement of plunger 115.

At pump body side 130 of circularly extending groove 140, a circumferential sealing surface 160 may extend continuously around axial direction 128 at radius Rmax providing a fuel seal with respect to pump barrel 110.

At pump head side 125 of circularly extending groove 140, zero fuel grooves 137, end face 138, recessed surface section 139, and circularly extending groove 140 may delimit two separated sealing surface sections 165. As explained below, the length of the axial extension of sealing surface sections 165 may be used to control the time period during which the pressure is built up. Thus, the length of the axial extension (and the size of fuel ports described below) may determine the amount of fuel pumped during an oscillation of plunger 115.

A control interface (helix) 170 may define the transmission of sealing surface section 165 to recessed surface section 139. Control interface (helix) 170, thus, may define at which axial position the radial extension of plunger 110 may reduce from radius Rmax towards radius Rred of the recessed surface section 139. Control interface 170 may extend, for example, in a helical manner around the axis of plunger 115. For example, control interface 170 may be shaped to continuously increase the length of the axial extension of sealing surface sections 165 and thus enlarges the width recessed surface section 139 in azimuthal direction at a constant rate along axial direction 128. In general, the axial extension of sealing surface section 165 at an azimuthal angle may be set by selecting the path of control interface 170 along the plunger surface.

Referring to FIG. 3, to provide fuel to pump chamber 135, a ring-shaped fuel gallery 175 may be formed between pump housing 105 and pump barrel 110. Fuel gallery 175 may surround pump barrel 110 at pump head side 125. Fuel gallery 175 may in principal be fluidly connected with the inside of pump barrel 110 via a pair of opposing fuel ports 180. Fuel gallery 175 may be connected to a large fuel reservoir (not shown).

During the oscillatory movement of plunger 115, fuel ports 180 may either open into pump chamber 135, be blocked by sealing surface sections 165, or open into pressure release chamber 145.

For the embodiments shown in FIG. 4 to FIG. 6, each sealing surface section 165 may interact with one of the opposing fuel ports 180. Specifically, each sealing surface may block its fuel port 180 for a limited time period during the oscillation of plunger 115. If plunger 115 is moving away from valve carrier 120, thus increasing pump chamber 135, sealing surface section 165 may not cover fuel port around the turn around point and fuel may flow into pump chamber 135. When plunger 115 returns towards valve carrier 120, sealing surface may close fuel ports 180 and, during the plunger's further movement, the fuel in pump chamber 135 may be pressurized until control interface 170 of sealing surface sections 165 may reach fuel ports 180. Then, fuel ports 180 may fluidly connect fuel gallery 175 with pressure release chamber 145.

During further movement of plunger 115 towards valve carrier 120, plunger 115 may push pressurized fuel out of pressure release chamber 145 into fuel gallery 175 along a passage delimited in radial direction by control interface 170 functioning as a side wall and in axial direction by the inner surface of pump barrel 110 and recessed surface section 139 of plunger 115.

As the axial position of control interface 170 may vary with the azimuthal angle of plunger 115, the axial position of plunger 115 for reopening fuel ports 180 and, thus, the time duration during which pressure is built up, may depend on the rotational position of plunger 115. Accordingly, the amount of fuel supplied by fuel pump 10 per pump cycle to injection system 16 may be controlled by rotating plunger 115. Specifically, depending on the angular position of plunger 115, pump chamber 135 may become fluidly connected to an outer fuel volume at an earlier or later time during the plunger oscillation.

To control the amount of pumped fuel, fuel pump 10 may further be configured to allow rotating plunger 115 in response to a control signal requesting a specific amount of fuel being provided to the injector system.

Rapid pressure changes may occur when control interface 170 passes the corresponding fuel port 180 as then the pressurized fuel may get in fluid connection with unpressurized fuel. A pressure wave may occur and propagate through fuel port 180. In addition, a fuel flow of pressurized fuel out of pressure release chamber 145 may occur. Within the fuel, cavitation may occur and affect, for example, the material of pump barrel 110 and plunger 115. When the cavitation wave occurs, the wave may start at the opening gap between the radial outer edge of control interface 170 and the radial inner edge of fuel port 180. The shock wave may propagate from the radial outer edge of control interface 170 along control interface 170. Configurations as disclosed herein may reduce or even avoid any cavitation effect.

Referring to FIGS. 5 and 6, reference numerals for features, which were previously introduced in connection with FIGS. 3 and 4, are maintained where feasible.

FIG. 5 shows an exemplary cross-section of a control interface 170A at a position at which a fuel passage 200 into fuel port 180 was just opened. In FIGS. 5 and 6, fuel port 180 is illustrated in a cut view by side walls 180A and 180B. The cross-sectional view of FIG. 5 illustrates the step-like configuration of control interface 170A. Two levels in radial direction of the step are provided by sealing surface section 165 and recessed surface section 139. In FIGS. 5 and 6, sealing surface section 165 may still at least partly cover fuel port 180.

Sealing surface section 165 may surround the axis of plunger 115 at plunger sealing radius Rmax while recessed surface section 139 may surround the axis of plunger 115 at reduced radius Rred. A control face 210 of plunger 115 may extend between sealing surface section 165 and recessed surface section 139.

To smoothen the structure of the side walls delimiting fuel passage 200, the step-like structure of control interface 170A may be structurally adapted at its radial inner section and/or at its radially outer section.

For example, at the radial inner section of control interface 170A, the transition between recessed surface section 139 and control face 210 may be formed with a curvature radius of at least 2 mm or larger, for example, with a curvature radius of 3 mm. This may allow a smooth stream of pressurized fuel along the indentation of the step.

In principle such a large (≤1 mm) radius is a specifically designed radius in contrast to a manufacturing defined radius due to the manufacturing tool, usually being in the range from 0.3 mm to 0.6 mm.

In addition to the radius in the transition from control face 210 to recessed surface section 139, a relief groove 150 may be provided. Then, an even larger radius may be applied as control face 210 may extend in radius below recessed surface section 139, although after the final extension radius, the relief groove may return the level of surface 139. The return to the level of surface 139 may be smooth. For example, a smooth change in curvature may avoid any corner at that transition.

The presence of relief groove 150 may enable an improved surface treatment of control face 210 as a surface treatment tool may have better access to control face 210.

In addition or alternatively, at the radial outer section of control interface 170A, the transition between sealing surface section 165 and control face 210 may comprise a chamfer face 220. For example, the angle α between chamfer face 220 and control face 210 may be in the range from 5° to 20°, for example, in the range from 10° to 15° such as 12°. At the radial outer section, the stream of pressurized fuel during operation may then only pass a corner of plunger 115 that has a corner angle larger than 90°.

As illustrated in FIG. 5, there may be formed a first flat corner 230 with a corner angle in the range of 160° to 175°, for example, in the range from 165° to 170° such as 168° between chamfer face 220 and a radial extending section of control face 210. Further there may be formed a second flat corner 240 with a corner angle in the range of 95° to 110°, for example, in the range from 100° to 105° such as 102° between chamfer face 220 and sealing surface section 165.

The angle of chamfer face 220 may be chosen such that the control of the temporal end of the fuel pressure build up may not be affected or may be affected in a still acceptable manner.

The curvature radius of control interface 170A at its radial inner section and chamfer face 220 may be configured such that a radially central section of control face 210 may extend essential only in a radial direction away from the plunger's axis for at least 20%, 30%, 40%, 50% or more of the height of the step.

One or both of the structural modifications at the radial inner section and the radial outer section may result in a smoothening of the surface passed by the pressurized fuel and may still provide for a sufficient directness of ending the fuel injection cycle.

FIG. 6 illustrates a further structural configuration of a control interface 170B. Instead of providing a chamfer, the curvature radius of control interface 170B at its radial inner section may be selected such that a curved face 300 may extend radially outwards up to radius Rmax. In some embodiments, the curvature radius may be selected such that curved face 300 may have a tangent T at radius Rmax that extends with respect to the radial direction under an angle α in the range from 5° to 20°, for example, in the range from 10° to 15° such as 12°. Then at the radial outer section, the stream of pressurized fuel may only pass a corner larger than 90° during operation.

In addition to the tangent defining radius, a relief groove may be provided. Then, an even larger radius may be applicable. The starting point of the curve may be the tangent point and the curvature may radially go even closer in radius than recessed surface section 139, and return then to the radius of surface section 139 in a smoothed manner as shown, for example, in FIG. 5.

The curvature radius may depend on radii Rmax and Rred and be, for example, at least 3 mm or larger, for example, with a tangential radius of 8 mm.

For comparison FIG. 7, shows a conventional control interface 400 with a conventional step-like cross-section. As indicated in FIG. 7, conventional control interface 400 may at its radial outer end form a 90°-corner with sealing surface section 165. At its radial inner end, conventional control interface 400 may have an intendation formed with a curvature radius of 0.5 mm.

INDUSTRIAL APPLICABILITY

As explained above, the amount of fuel supplied by a fuel pump per pump cycle to the injection system may be controlled by rotating a plunger. For that purpose, the plunger may comprise at least one control element (not shown in the figures) at a lower portion of the plunger to allow rotating plunger and, thereby, adjusting the amount of pumped fuel per cycle. Depending on the rotational position of the plunger, the pump chamber may become fluidly connected to an outer fuel volume at an earlier or later time during the plunger oscillation.

The features and embodiments of the structural configuration of a control interface explained in connection with FIGS. 5 and 6 may reduce alone or in combination disadvantageous affects caused by cavitation during operation of the fuel pump.

In some embodiments, one or more surfaces of the control interface may be processed to be high quality surfaces, in particular with respect to their surface roughness, in connection with coatings, a minimum surface roughness of $Ra<0.8$ may be applicable, for uncoated surfaces a minimum surface roughness of $Ra<1.2$ may be applicable.

In some embodiments, the control interface may be curved (or comprise a curved section) to provide a specifically pre-set dependence of the amount of pumped fuel on the angular position of plunger. Alternatively, the control interface may also have any other configuration suitable to provide a desired shape of the sealing surface sections for controlling the fuel supply volume of the fuel pump in an intended manner.

In some embodiments, the fluid connection between the pump chamber and the circular groove may be—in azimuthal direction—minimal at the beginning of the zero fuel groove and widen in azimuthal direction towards the circular chamber.

In some embodiments, the plunger may be made of hardened steel. In some embodiments, the plunger may comprise at least one protection layer made of DLC (Diamond-like Carbon) or WCC (Wolfram Chrome Carbide) for protecting the plunger and improving its tribology. In some embodiments, plunger may comprise ceramic or ceramic-like materials.

While FIG. 3 indicates two opposing fuel ports, the pump barrel may be provided with only one fuel port or a larger number of fuel ports. In general, it is common to provide for each fuel port a control interface. For example, as shown in FIG. 3, for a pair of fuel ports, also a pair of control interfaces may be provided.

Although the preferred embodiments of this invention have been described herein, improvements and modifications may be incorporated without departing from the scope of the following claims.

The invention claimed is:

1. A plunger of a fuel pump, comprising:
   a cylindrical base configured for axial movement and rotation within a pump barrel;
   a fuel amount controlling end having an outer surface that comprises:
      a zero fuel groove on the outer surface, the zero fuel groove extending from an end face of the plunger along an axial direction of the plunger;
      a recessed surface region;
      a sealing surface section; and
      a control interface connecting the recessed surface region with the sealing surface section in a generally radial direction, the control interface extending helically from the zero fuel groove around a plunger axis,
         wherein the transition from the recessed surface region to the control interface is curved with a curvature radius that has a radius equal to or larger than about 1 mm.

2. A plunger, comprising:
   a generally cylindrical base configured for axial movement and rotation within a pump barrel;
   a fuel amount controlling end having an outer surface that comprises:
      a zero fuel groove on the outer surface, the zero fuel groove extending from an end face of the plunger along an axial direction of the plunger;
      a recessed surface region;
      a sealing surface section; and
      a control interface connecting the recessed surface region with the sealing surface section in a generally radial direction, the control interface extending helically from the zero fuel groove around a plunger axis,
         wherein the transition from the recessed surface region to the control interface is curved.

3. The plunger of claim 1, wherein the recessed surface region partially surrounds the plunger axis at a radius (Rred) and the sealing surface section partially surrounds the plunger axis at a plunger sealing radius (Rmax) such that, in the mounted state, a pressure release chamber is formed between the recessed surface region and an inner surface of the pump barrel.

4. The plunger of claim 1, wherein the curvature radius of the transition from a control face of the control interface to the recessed surface region has a radius greater than or equal to about 2 mm.

5. The plunger of claim 1, wherein the transition from the control face to the recessed surface region is configured as a curved face providing
   a curvature radius of the transition from a control face to the recessed surface region larger than about 2 mm at the radial inner section of the control interface, and
   a corner angle larger than about 90° at the radial outer section of the control interface.

6. The plunger of claim 5, wherein the curvature radius of the transition from the control face to the recessed surface region has a radius such that a tangent at the control face at the plunger sealing radius (Rmax) extends with respect to the radial direction at an angle in the range from about 5° to about 20°.

7. The plunger of claim 1, wherein the outer surface of plunger further comprises a chamfer face as a transition between the control face and the sealing surface section.

8. The plunger of claim 7, wherein the chamfer face is configured to extend at an angle with respect to the control face in the range from about 5° to about 20°.

9. The plunger of claim 7, wherein the chamfer face is configured as a plane face.

10. The plunger of claim 7, wherein the control interface comprises a flat corner with a corner angle in the range of about 160° to about 175° between the chamfer face and a radial extending section of the control face.

11. The plunger of claim 1, wherein a width of the recessed surface section in an azimuthal direction increases at a constant rate along the axial direction.

12. The plunger of claim 1, wherein the curved transition is provided with a groove extending to a radius that is smaller than the radius of the recessed surface region.

13. The plunger of claim 12, wherein the groove is machined as an undercut transitioning smoothly into the recessed surface region.

14. A fuel pump for an internal combustion engine, the fuel pump comprising:
   a pump housing;
   a pump barrel disposed within the pump housing; and
   a plunger disposed within the pump barrel, the plunger including:
      a generally cylindrical base configured for axial movement and rotation within a pump barrel;
      a fuel amount controlling end having an outer surface that comprises:
         a zero fuel groove on the outer surface, the zero fuel groove extending from an end face of the plunger along an axial direction of the plunger;
         a recessed surface region;
         a sealing surface section; and
         a control interface connecting the recessed surface region with the sealing surface section in a generally radial direction, the control interface extending helically from the zero fuel groove around a plunger axis, wherein the transition from the recessed surface region to the control interface is curved.

15. The pump of claim 14, wherein the pump barrel comprises a fuel port, and the control interface of the plunger is configured to control the amount of fuel pumped per cycle based on the rotational position of the plunger.

16. The pump of claim 14, wherein the recessed surface region partially surrounds a plunger axis at a radius (Rred) and the sealing surface section partially surrounds the plunger axis at a plunger sealing radius (Rmax) such that, in the mounted state, a pressure release chamber is formed between the recessed surface region and an inner surface of the pump barrel.

17. The pump of claim 14, wherein the curvature radius of the transition from a control face of the control interface to the recessed surface region has a radius greater than or equal to about 2 mm.

18. The pump of claim 14, wherein the transition from the control face to the recessed surface region is configured as a curved face providing
   a curvature radius of the transition from a control face to the recessed surface region larger than about 2 mm at the radial inner section of the control interface, and
   a corner angle larger than 90° at the radial outer section of the control interface.

19. The pump of claim 18, wherein the curvature radius of the transition from the control face to the recessed surface region has a radius such that a tangent at the control face at the plunger sealing radius (Rmax) extends with respect to the radial direction at an angle in the range from about 5° to about 20°.

20. The pump of claim 14, wherein the outer surface of plunger further comprises a chamfer face as a transition between the control face and the sealing surface section.

* * * * *

UNITED STATES PATENT AND TRADEMARK OFFICE
CERTIFICATE OF CORRECTION

| | |
|---|---|
| PATENT NO. | : 9,523,335 B2 |
| APPLICATION NO. | : 14/403094 |
| DATED | : December 20, 2016 |
| INVENTOR(S) | : Von der Osten-Sack et al. |

Page 1 of 1

It is certified that error appears in the above-identified patent and that said Letters Patent is hereby corrected as shown below:

In the Claims

Column 10, Line 42, In Claim 15, delete "The pump of claim 14," and insert -- The fuel pump of claim 14, --.

Column 10, Line 46, In Claim 16, delete "The pump of claim 14," and insert -- The fuel pump of claim 14, --.

Column 10, Line 53, In Claim 17, delete "The pump of claim 14," and insert -- The fuel pump of claim 14, --.

Column 10, Line 57, In Claim 18, delete "The pump of claim 14," and insert -- The fuel pump of claim 14, --.

Column 10, Line 65, In Claim 19, delete "The pump of claim 18," and insert -- The fuel pump of claim 18, --.

Column 11, Line 4, In Claim 20, delete "The pump of claim 14," and insert -- The fuel pump of claim 14, --.

Signed and Sealed this
Sixteenth Day of May, 2017

Michelle K. Lee
*Director of the United States Patent and Trademark Office*